United States Statutory Invention Registration [19]

[11] Reg. Number: H84

Bumgardner

[45] Published: Jul. 1, 1986

[54] REAL-TIME POLAR CONTROLLED VIDEO PROCESSOR

[75] Inventor: Jon H. Bumgardner, Ridgecrest, Calif.

[73] Assignee: The United States of America as represented by the Secretary of the Navy, Washington, D.C.

[21] Appl. No.: 737,136

[22] Filed: May 23, 1985

[51] Int. Cl.[4] ..... H04N 7/01; H04N 5/14

[52] U.S. Cl. ..... 358/140; 358/160

[56] References Cited

U.S. PATENT DOCUMENTS

| | | | |
|---|---|---|---|
| 3,732,568 | 5/1973 | O'Mary et al. | 343/17.7 |
| 4,225,929 | 9/1980 | Ikeda | 364/521 |
| 4,267,573 | 5/1981 | Chaikin et al. | 364/515 |
| 4,432,009 | 2/1984 | Reitmeier et al. | 358/22 |
| 4,434,437 | 2/1984 | Strolle et al. | 358/140 |

*Primary Examiner*—Stephen C. Buczinski
*Assistant Examiner*—Linda J. Wallace
*Attorney, Agent, or Firm*—Robert F. Beers; W. Thom Skeer

[57] ABSTRACT

The real-time polar controlled video processor electronically rotates scene information in a real-time video processor. By dynamically specifying the origin of each desired consecutive output line from subpixel space, and by specifying the delta "X" and delta "Y" inputs (of X-Y Cartesian coordinates) to a real-time coefficient generator, a subpixel generator can sweep through a stored image database at any arbitrary angle and scale factor. Subpixels which are generated sequentially describe any image size, orientation, and position. This scheme allows dynamic line-by-line accommodation of dynamically rotating sensor outputs.

8 Claims, 8 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

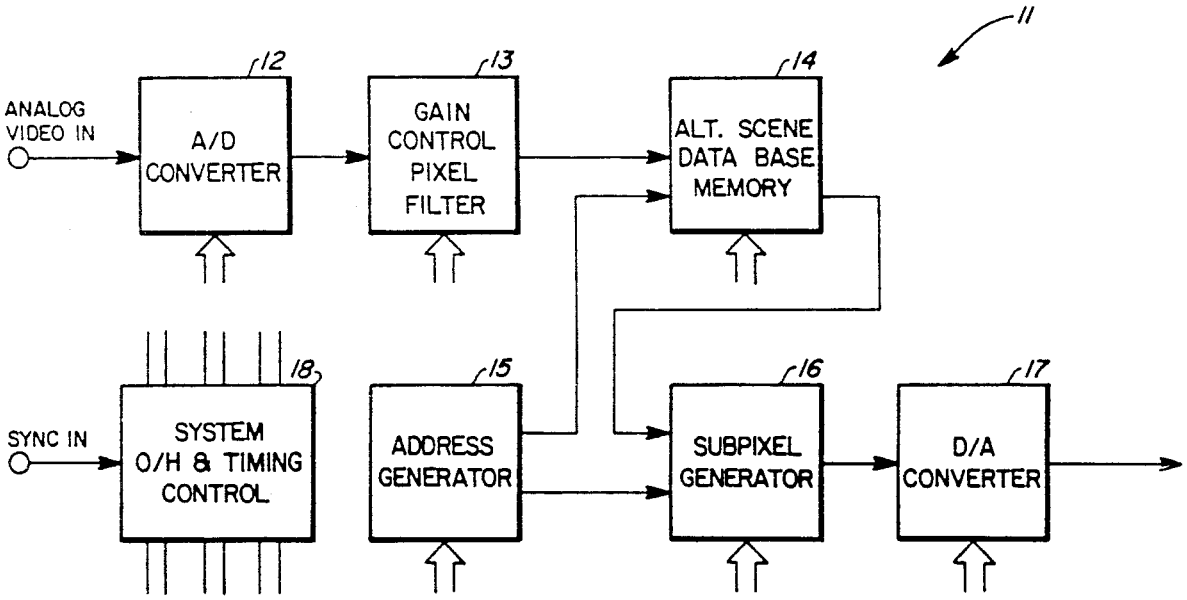
Fig. 1
Fig. 2
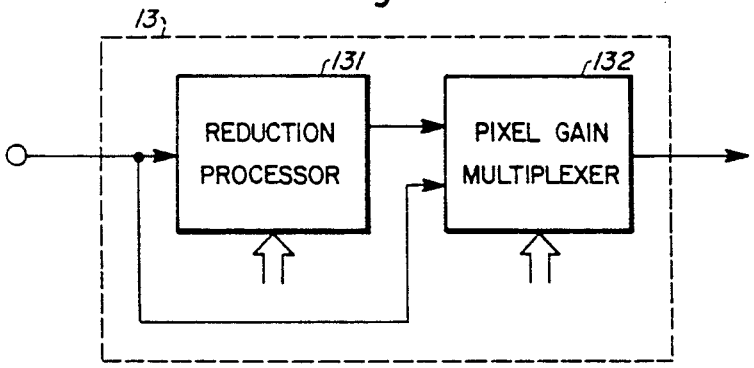
Fig. 3
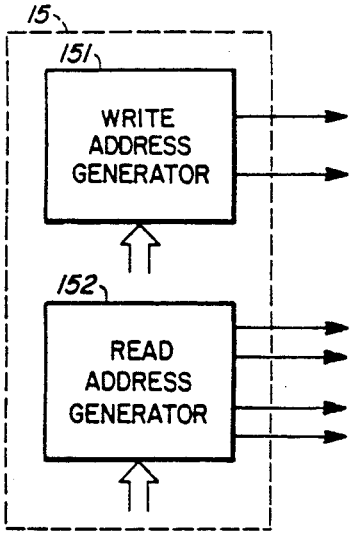

REAL-TIME POLAR CONTROLLED VIDEO PROCESSOR

BACKGROUND OF THE INVENTION

1. Field of the Invention

This invention relates to digital processing and, in particular, to digital processing of video imagery. More particularly, this invention relates to rotation, along with various gain factors and translations, of the video image through digital processing.

2. Description of the Prior Art

Past methods of rotation have included new coordinate generation but without new pixel locations, skewing the original coordinates with a loss of image resolution, and mere rearrangement of the pixels through address modification. None of these methods includes the creation of new subpixels with interpolated brightness values in relation to the original pixels so as to create a rotation of an image which maintains accuracy in shape, has no smearing, displays no incremental jerks while rotating, has no false edge generation, and retains the same shading, brightness and sharpness of the unrotated image. In particular the prior art does not allow all the preceding to take place with rotation centered at any point, including rotation center points outside the field of view, with simultaneous translation in any vectored direction by any arbitrary amount, and with simultaneous image size scaling and control, using all of expansion, unity, and reduction scale factors of very large range and resolution.

SUMMARY OF THE INVENTION

The present video processor has the capability of rotating video information on a display in a digital manner different from prior approaches in the video processor arts. The video signals are first digitalized. Then they are put through a gain stage which may be controlled to produce unity, reduction or expansion of image size. The gain stage is a digitized process which is combined with an addressing process of the memory containing the image database. Through this addressing process, the image may be rotated through x and y coordinates, allowing skewed storage of source pixel information. The image may be rotated about any point on or off the image itself. Between the original pixels are subdivisions or subpixels upon which new pixels may be located in lieu of the original pixels, together with new gray levels which are interpolations of the gray levels of the original pixels. The altered scene database is outputted to a digital-to-analog converter so that the video may be displayed.

OBJECTS OF THE INVENTION

Accordingly it is an object of this invention to provide an improved video signal processing system to rotate video images.

A further object of this invention is to provide an apparatus to rotate video images about an axis which may lie outside the video field of view.

A still further object of the present invention is to provide a video signal processor which generates coefficients in real-time.

Yet another object of the present invention is to provide a video signal processor which rotates video images without loss of resolution.

A further object of this invention is the provision of a signal processor which rotates images without jitter or smear.

Another object of this invention is the provision of a signal processor with a minimal set-up time or process command time.

BRIEF DESCRIPTION OF THE DRAWINGS

The foregoing and other objects and advantages of the present invention will become more readily apparent from the following detailed description, as taken in conjunction with the accompanying drawings, wherein:

FIG. 1 is a functional block diagram of the real-time polar controlled video processor;

FIG. 2 is a detailed block diagram of the gain controlled pixel filter;

FIG. 3 is a detailed block diagram of the address generator;

DESCRIPTION OF THE SPECIFIC EMBODIMENT

Figure 4:
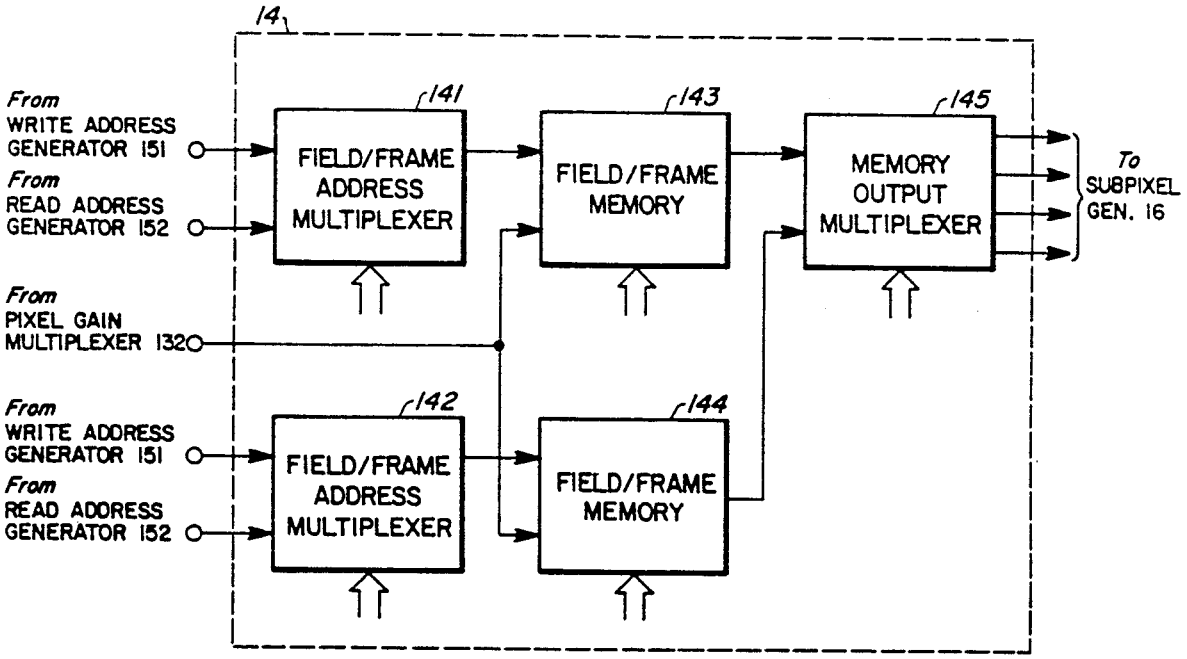
FIG. 4 is a detailed block diagram of the alternating scene database memory.

Referring to FIG. 1, an analog-to-digital, AD, converter 12 received the analog signal from a conventional video detector, not shown, and converts the signal to digital signals to facilitate digital processing by the circuitry of the invention. The conversion is effected at the pixel rate which is controlled by the resolution requirements of the system in the well-understood manner. Although any commercially available circuitry element may be used in accordance with good engineering practice, in an eight-bit developmental model a TDC 1019J unit manufactured by TRW Incorporated of Cleveland, Ohio, was used.

The output from AD converter 12 is fed to a gain controlled pixel filter 13. As the name implies, gain controlled pixel filter 13 passes the digital video signals with either reduction or amplification as required. The ratio of gain/reduction are chosen to satisfy application requirements. Other requirements, affecting gain choices may involve imaging and signal processing considerations such as Nyquist sampling theorem requirements, for example.

The output from gain controlled pixel filter 13 is fed to an alternating scene database memory 14. As the name suggests, two channels of field/frame memory are provided by alternating scene database memory 14. The duality permits a memory to be enabled at all times to receive data. The output of alternating scene database memory 14 is fed to a subpixel generator 16.

Subpixel generator 16 produces a brightness for the subpixel which is an element of the rotated and gain processed image. The relative brightness is a function of the brightness of the adjacent pixel elements of the original scene. The operation of this circuit and the description of its component parts will be more completely described herein.

Alternating scene database memory 14 and subpixel generator 16 each receive inputs from an address generator 15. Address generator provides read and write addresses for the individual pixel elements from a signal received from a system overhead and timing control circuit 18.

The output of the subpixel generator 16 is fed to a conventional video digital-to-analog converter 17 to output the desired video signal. As indicated by the broken arrows in the various figures, all of the aforedescribed circuits receive the necessary timing signals and memory address signals from a system overhead and timing circuit 18. The addresses corresponding to the rotated and gain controlled signals and necessary synchronously generated timing pulses are provided by this software-controlled circuit. In the eight-bit developmental model this function was performed by a microprocessor circuit based on a conventional 68000 microprocessor circuit. Other conventional microprocessor arrangements could be used as well with suitable engineering trade-offs. The circuit solves the trigonometric relationships of the output pixel addresses caused by a selected gain, amount of rotation, and center of rotation of an input pixel. The exact circuitry and accompanying software, which form no part of this subject invention are left to such engineering skill and will not be described further.

Referring to FIG. 2, gain-controlled pixel filter 13 receives the output of AD converter 12 and may comprise multiplexers 132 such as 74F157 Fairchild in the pixel gain multiplexers 13 of FIG. 2. The reduction processor 131 consists of multipliers, summers and accumulators (MPY-8HUJ, 74F283, 74F374, respectively, as example ICs). The gain-controlled pixel filter 13 may pass pixels straight through unaltered for unity gain or may combine and average pixels for sub-unity gain as required for Nyquist sampling theorem requirements. As previously noted, filter 13 works in a coordinated manner with address generator 15.

The address generator 15, FIG. 3, comprises a write address generator 151 and a read address generator 152. These elements cooperate in the conventional manner to originate the location into which incoming pixel information from the gain-controlled pixel filter 13 is stored, and the location from which data to the memory output multiplexer 145, to be described, is originated. The primary components of the address generator 15 are registers and summers such as 74F374 and 74F283.

The write address generator 151 is a component part of gain-controlled pixel filter 15 and "steers" the incoming pixel to the proper location in memories within alternating scan database memory 14. When in the reduction mode, write address generator 151 does not necessarily produce a unique pixel address for each new system pixel period time, because gain-controlled pixel filter 15 is averaging and combining individual input pixels. If desired, write address generator 151 may be integrated into the reduction processor 131 of FIG. 2 and the alternating scene database memory 14 for hardware part count minimization, but is shown separate for purposes of clarity. Unity gain with no rotation causes a one for one incoming pixel-to-write-address correlation.

The details of read address generator 152 will be described in greater detail in conjunction with subsequent figures.

Referring to FIG. 4, the circuit components of alternating scene database memory 14 are illustrated. Field/-frame address multiplexers 141 and 142 receive output signals from write address generator 151 and read address generator 152 of gain control pixel filter 15. The read and write address output of field/frame address multiplex circuit is fed to a field/frame memory 143. Similarly, a field/frame memory 144 receives outputs from gain control pixel filter 13. The outputs from field memories 143 and 144 are fed to a memory output multiplexer circuit 145. Please note a normal feature of memories 143 and 144 is output of a normal scene database intensity value when the subpixel comes from valid source scene area, or output of a substitute fixed marker intensity value when addressing beyond-scene-border subpixel locations. As previously noted, all three multiplexer circuits 141, 142, and 145 together with the two field/frame memories 143 and 144 receive clocking signals from system overhead and timing controller 18. The clocking signals ensure alternate operation so as to ensure each address will be stored and properly outputted.

Figure 5:
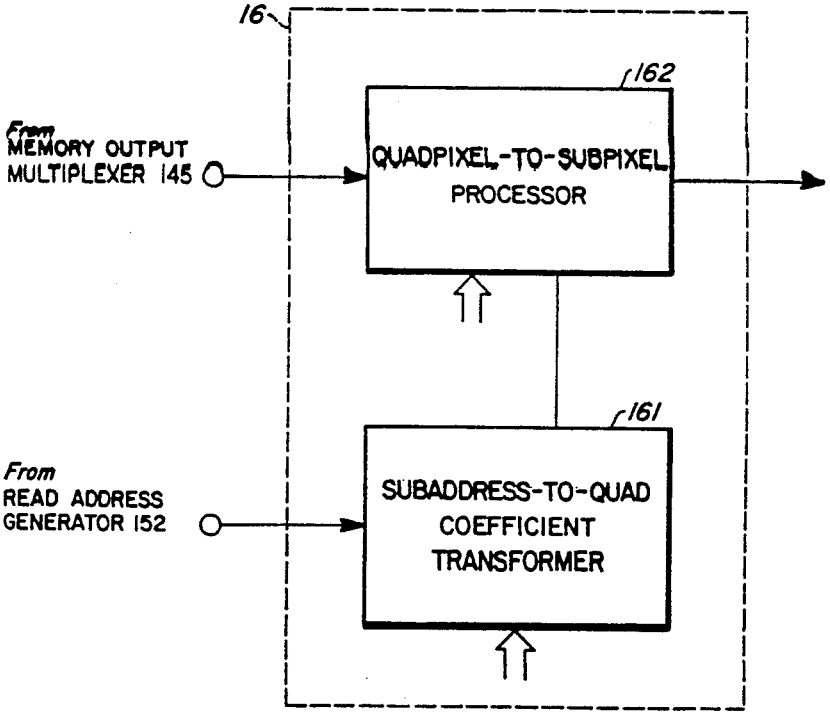
FIG. 5 is a detailed block diagram of the subpixel generator.

FIG. 5 shows that subpixel generator 16 includes a quadpixel to subpixel processor 162 and a subaddress to quad coefficient transformer 161. The component parts and operation of these circuits will be described in greater particularity herein.

Figure 6:
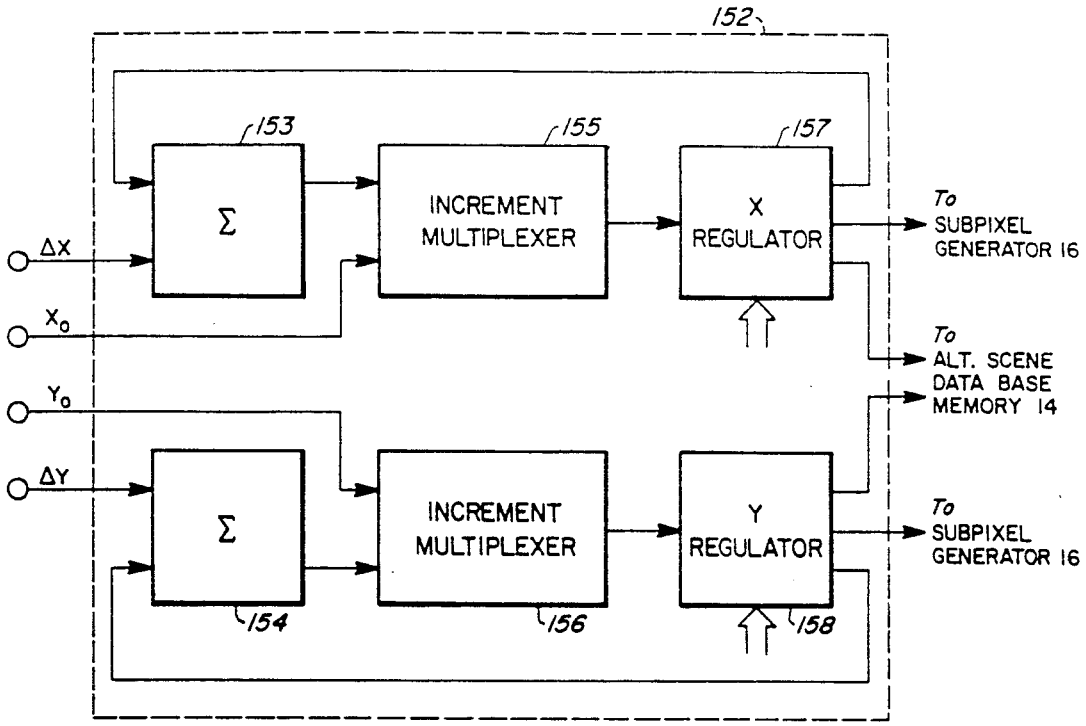
FIG. 6 is a schematic of the read address generator.

FIG. 6 illustrates the component circuits which together comprise the read address generator illustrated in FIG. 3. Two summers 153 and 154 receive X and Y address signals, respectively, from the system overhead and timing control 18. The outputs of summers 153 and 154 are fed to increment multiplexer circuits 155 and 156 which, in turn, output signals to registers 157 and 158. Increment multiplexers 155 and 156 also receive $X_o$ and $Y_o$ address signals from system overhead and timing circuitry 18. Outputs from registers 157 and 158 are fed back to summers 153 and 154 to be summed with the $\Delta X$ and $\Delta Y$ signals. Observe that $\Delta X$ and $\Delta Y$ are signed binary numbers allowing both positive and negative position updating. The outputs from registers 157 and 158 are fed to subpixel generator circuit 16 and to alternating scene database memory 14, as illustrated.

Figure 7:
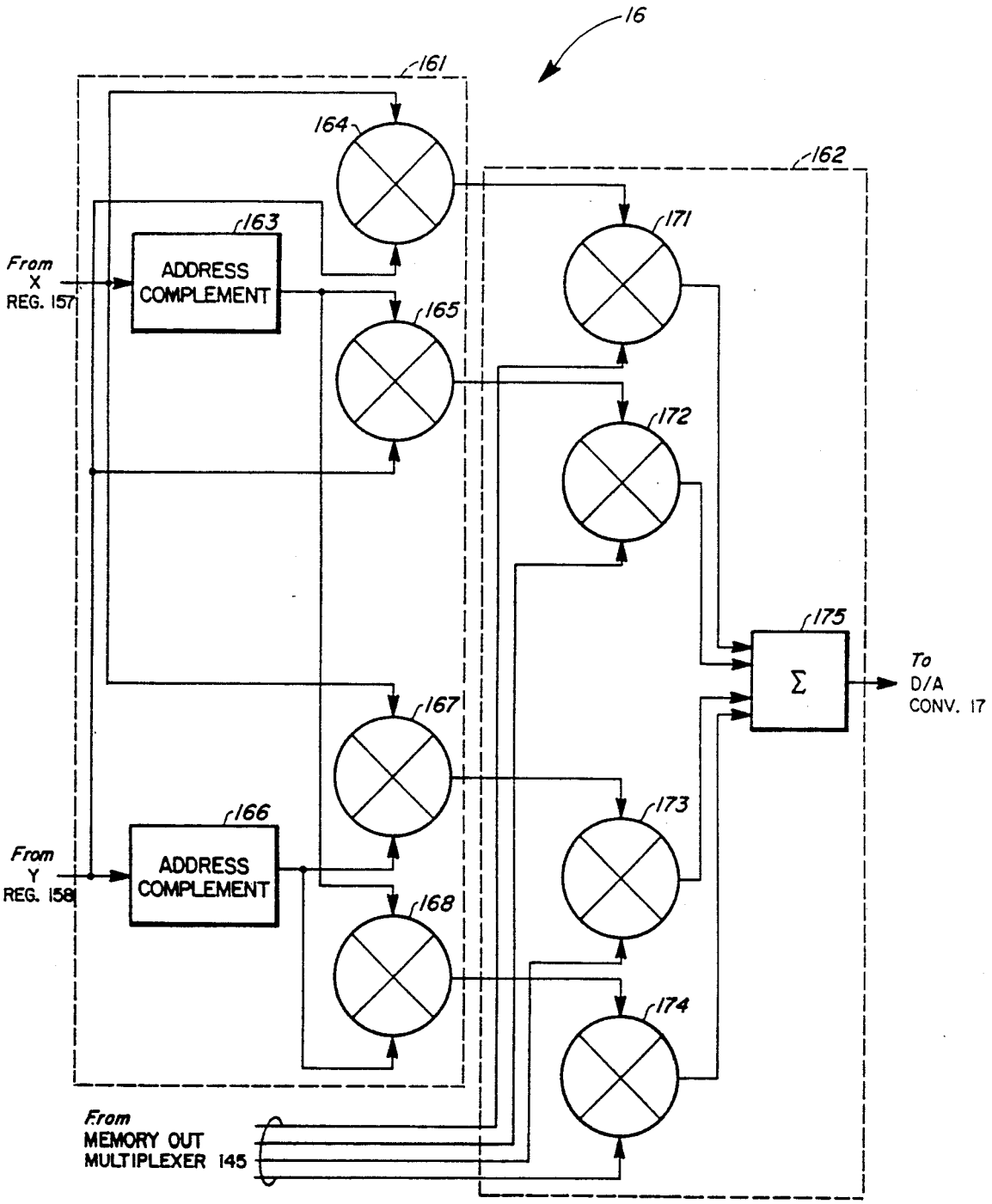
FIG. 7 is a schematic of the subaddress-to-quad-coefficient transformer, and the quadpixel-to-subpixel processor.

FIG. 7 shows the circuitry comprising subpixel generator 16 in greater detail than illustrated in FIG. 5. Signals from X and Y registers 157 and 158 are fed to address complement circuits 163 and 166 and to a first set of multipliers 164, 165, 167, and 168 in the manner illustrated. The outputs from first set of multipliers are fed to a second set of multipliers 171–174. The output of memory output multiplexers 145 is also connected to supply inputs for the second set of multipliers. Summing circuit 175 outputs the subpixel set needed to create the video presentation which is fed to digital-to-analog converter 17 to produce the composite video.

The combined circuitry is capable of processing video input signals to permit scene rotation and magnification/reduction in what is essentially real-time. That is, although the circuitry has some finite processing time, the processing time is very small in comparison to the frame rate such that a real-time readout of video input is very closely approximated.

The operation and further construction details will be described in connection with the various previously described figures and FIG. 8, yet to be discussed.

The read address generator 152, shown in FIGS. 3 and 6, is the key to the polar controlled capability of the system of the invention, as well as real-time operation. The read address generator 152 generates successive location parameters (X and Y) which overlay the image laid down in the memories 143 and 144. Each successive output pixel from the entire system has a unique X,Y coordinate pair generated by read address generator 152.

The relative geometric spacing is provided by gain, rotation, and offset commands given to the system from external application requirements, i.e., one set of parameters $\theta$, G, X and Y, which designate angle of rotation, gain or image size factor, and image translation, will generate a series of subpixel addresses in memory space. The $\Delta X$ and $\Delta Y$ values dictated by $\theta$, G, X and Y alter the X and Y output of read address generator 152 in real-time with each successive output pixel requirement. The generated address from read address generator 152 has both an integer pixel portion and a subpixel (i.e., fractional pixel) portion.

Referring to FIGS. 6 and 7, the position of the original pixel is designated as $X_o$ and $Y_o$. The data designating $X_o$ and $Y_o$ are fed to increment multiplexers 155 and 156, respectively. The $\Delta X$ and $\Delta Y$, the subpixel interspacings values are fed into summers 153 and 154 respectively, shown in FIG. 6, which in turn increment outputs of multiplexers 155 and 156. The multiplexer outputs are fed into the appropriate X and Y registers, 157 and 158. X and Y registers 157 and 158 are incremented by $\Delta X$ and $\Delta Y$ for each pixel by a signal from the system overhead and timing controller 18.

The values for $X_o$, $Y_o$, $\Delta X$ and $\Delta Y$ are also obtained from controller 18.

As shown in FIG. 7, the outputs of registers 157 and 158 are fed to the field/frame address multiplexers 141 and 142 shown in FIG. 4 and to the subaddress to quad coefficient transformer 161, a component circuit of subpixel generator 16 and illustrated in FIGS. 5 and 7.

As shown in FIG. 7, the signal from register 157 to transformer 161 goes to multiplexers 164 and 167, and to address complementer (256–xLsp) 163. The output from address complementer 163 goes to multipliers 165 and 168. Similarly, the signal from register 158 goes to multipliers 164 and 165, and to address complementer (256–xLsp) 166. The output from address complementer 166 is fed to multipliers 167 and 168.

Essentially transformer 161 makes a two to four conversion of the output signals from read address generator 152, a component circuit of address generator 157, to quadpixel to subpixel processor 162.

FIG. 7 shows the four outputs from multipliers 164, 165, 167, and 168, are fed to multipliers 171–174 respectively. Data from the memory output multiplexer 145 of FIG. 4 is also fed into multipliers 171–174 respectively, resulting in four products which are summed in summer 175 thus providing a subpixel output of the proper brightness based on the respective brightnesses of the four closest pixels of the original input image.

Figure 8:
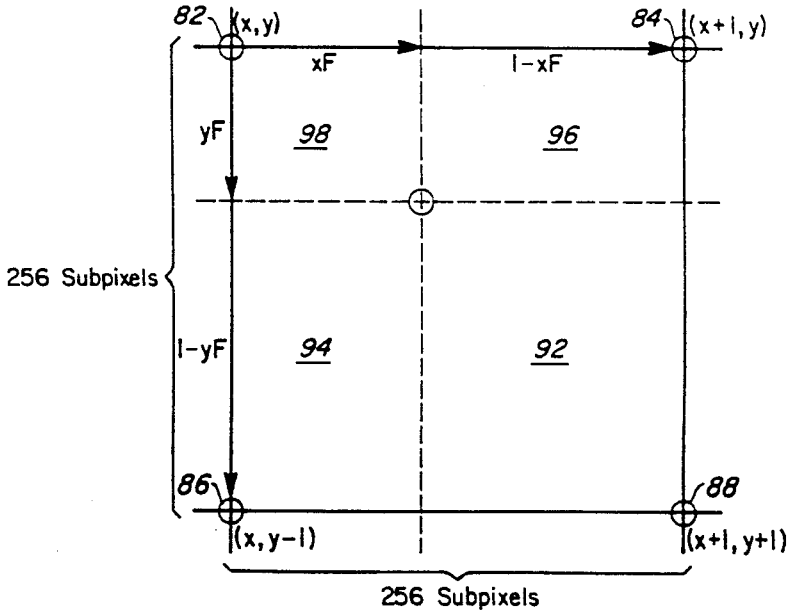
FIG. 8 is a diagram of typical locations of pixels and a subpixel as processed within the video processor.

In FIG. 8, a diagram illustrates how the brightnesses of four original pixels 82, 84, 86 and 88, are incorporated to determine the brightness of a new subpixel 90. The contribution of the brightness of each original scene pixel, 82, 84, 86 or 88, to determine subpixel 90 brightness is analogous to an area-related function. The area associated with an opposite pixel determines a respective pixel's contribution of brightness to the subpixel 90. For example, the amount of contribution of brightness of pixel 82 is determined by area 92, of pixel 84 by area 94, of pixel 88 by area 98, and of pixel 86 by area 96. The four pixel brightnesses are averaged according to contribution determined by area. The following formula applies if 82, 84, 86 and 88 represent the magnitudes of brightnesses of the corresponding pixels as noted in FIG. 4:

$$\frac{(82 \times 92) + (84 \times 94) + (86 \times 96) + (88 \times 98)}{92 + 94 + 96 + 98}$$

The numerator products are performed by multipliers 171–174 and the numerator sums by summer 175. The sum of the area 92, 94, 96 and 98, which is the denominator is a constant determined by the pixel parameters used in the system.

The alternating scene database memory 14, in FIGS. 1 and 4, consists of field/frame address multiplexers 141 and 142, field/frame memories 143 and 144, and a memory output multiplexer 145, as previously described. The alternating action permits one memory to record an incoming image during the time interval the other memory provides a previous-image-total-data to the output circuitry, including memory output multiplexer 145. At the completion of each frame or field, depending upon the chosen form of image processing, the memory roles of writing and reading are reversed.

Between the address generators 151 and 152 and the field/frame memories 143 and 144, field/frame address multiplexers 141 and 142 are located. Multiplexers 141 and 142 are preferably of an integrated circuit type 74F157, although other commercially available circuits may be used. The multiplexers 141 and 142 allow each memory address to be controlled by the proper read or write address. Even though shown as distinct entities, it should be understood that, an alternate implementation may involve integration of the address generators 151 and 152 into the memories 143 and 144 resulting in a multiplex *mode* of the generators 151 and 152 rather than the multiplex *choice* of the generators. Obviously, such integration is a way of maximizing speed performance and minimizing parts count.

The field/frame memories 143 and 144 may be static memories such as 16KX1 IMS 1400 INMOS integrated circuits. Or by using "smart memory techniques," devices such as 16KX4 IMS 2620 dynamic random access memories (RAMs) can be used to reduce parts count and cost. The purpose of memories 143 and 144 is merely to be able to sequentially write single pixels, and to read four mutually adjacent pixels at a time ($2\times2$ spacing) under the direction of the write address generator 151. The integer portion of the X,Y coordinates determines the first point with the other three required points being: $(X+1,Y)$; $(X,Y+1)$; and $(X+1,Y+1)$, see FIG. 8. These four points are passed on to the memory output multiplexer 145. The X,Y value comes from the read address generator 152 via field/frame address multiplexers 141 and 142.

The memory output multiplexer 145 may be composed of 74F157 multiplexer integrated circuits. The memory output multiplexer 145 chooses which memory output data will be used by the subpixel generator 16. Subpixel generator 16 is the actual generator of subpixel values and uses the four X,Y pixel values supplied by the memory output multiplexer 145, a component circuit of alternating scene database memory 14. Proper weighting is determined by the read address generator 152 into fractional X,Y read coordinates, i.e., the fractional portion of the subpixel address X,Y value.

The subaddress to quad coefficient transformer 161 takes the two address fractional values and converts these into four products by using the $X_FY_F$, $X_F(1-Y_F)$, $(1-X_F)Y_F$, and $(1-X_F)(1-Y_F)$ products, see FIG. 8. The components of transformer 162 are primarily MPY-8HUJ type multipliers.

The quadpixel to subpixel processor 162 properly matches each of the four coefficients from the subaddress to quad coefficient transformer 161 with four corresponding pixels from the memory output multiplexer 145 and performs a merge operation to form the designated subpixel numeric, or brightness, value. Within the quadpixel to subpixel processor 162 are four multipliers 171–174 and one summer 175. The multipliers 171–174 form four products as explained above. MPY-8HUJ type integrated circuits manufactured by TRW have been used as the multipliers in development models of the invention. Summer 175 may be composed of 74F283 type adders. The summer 175 adds each of the four subpixel subcomponents to provide the total subpixel value. The resolution should be at least two bits greater than each multiplier input resolution, either 171, 172, 173, or 174, of the quadpixel to subpixel processor 162 input word, i.e., ten bits minimum if the inputs of processor 162 are eight-bit coefficients and eight-bit pixel values as in the development models of the invention.

The digital-to-analog converter 17 is chosen to be capable of the full required system pixel rate. The same rate is required for the analog-to-digital converter 12. Converter 17 may encompass a TDC 1016J-8 type device by TRW.

The system overhead and timing controller 18, not a part of the signal processing circuitry of the invention, comprises several integrated circuits, particularly an MC68000 Motorola microprocessor and conventional supporting hardware. The purpose of controller 18 is to convert externally supplied $\theta$, G, X, and Y values to internal $\Delta X$, $\Delta Y$, $X_o$ and $Y_o$ control values for address generators 151 and 152, allowing rotation about any arbitrary point and accuracy and translation by any arbitrary magnitude and direction, and gain change by any arbitrary factor and accuracy, and to provide total system synchronization with external blanking and so forth. Such functions are conventionally generated by established functions. Controller 18 also supplies multiplexer state control, as well as "overseeing" of various pipelining controls which optimize system component count and versatility.

Although the foregoing description sets forth a preferred embodiment of the invention, certain modifications within the scope of the appended claims will suggest themselves to a person skilled in the art of video circuitry. As an obvious example, the enumerated IC circuits are for use in a system employing an eight-bit processing system which would be changed when other processing systems are employed. Similarly, following good digital design practice the functions of various ICs could be combined or shared between other ICs. Such alterations within the scope of the appended claims are to be made with due consideration to good design and engineering practices and the description should be considered as exemplary of such configurations.

The foregoing description taken together with the drawings to which it refers and the appended claims constitute a disclosure such as to enable one skilled in the optical processor arts to make and use the invention. Furthermore, this disclosed invention is a meritorious advance in the art which is unobvious to such an artisan not having the benefit of the teachings contained therein.

What is claimed is:

1. A real-time polar controlled video processor comprising:

an analog-to-digital converter;

a gain-controlled pixel filter connected to said analog-to-digital converter;

an alternating scene database memory connected to said gain-controlled pixel filter;

a subpixel generator connected to said alternating scene database memory;

an address generator connected to said alternating scene database memory and to said subpixel generator; and a digital-to-analog converter connected to said subpixel generator.

2. A real-time polar controlled video processor, according to claim 1, wherein said gain controlled pixel filter comprises:

a reduction processor connected to said analog-to-digital converter and to said system overhead and timing controller; and a pixel gain multiplexer connected to said reduction processor, to said analog-to-digital converter, and to said alternating scene database memory.

3. A real-time polar controlled video processor, according to claim 1, wherein said address generator comprises:

a write address generator connected to said alternating scene database memory; and a read address generator connected to said alternating scene database memory, and to said subpixel generator.

4. A real-time polar controlled video processor, according to claim 1, wherein said alternating scene database memory comprises:

a first field/frame address multiplexer connected to said address generator;

a second field/frame address multiplexer connected to said address generator;

a first field/frame memory connected to said gain-controlled pixel filter, to said first field/frame multiplexer;

a second field/frame memory connected to said gain-controlled pixel filter, to said second field/frame address multiplexer; and a memory output multiplexer connected to said first field/frame memory, to said second field/frame memory, to said subpixel generator.

5. A real-time polar controlled video processor, according to claim 1, wherein said subpixel generator comprises:

a quadpixel to subpixel processor connected to said alternating scene database memory, and to said digital-to-analog converter; and a subaddress to quad coefficient transformer connected to said quadpixel to subpixel processor, and to said address generator.

6. A real-time polar controlled video processor, according to claim 3, wherein said read address generator comprises:

a first increment multiplexer;

a second increment multiplexer;

a first register connected to said first increment multiplexer, to said subpixel generator, and to said alternating scene database memory;

a second register connected to said second increment multiplexer, to said subpixel generator, and to said alternating scene database memory;

a first summer connected to said first increment multiplexer, and to said first register; and a second summer connected to said second increment multiplexer, and to said second register.

7. A real-time polar controlled video processor, according to claim 5, wherein said subaddress to quad coefficient transformer comprises:

a first multiplier connected to said quadpixel to subpixel processor and to said address generator;

a second multiplier connected to said quadpixel to subpixel processor and to said address generator;

a third multiplier connected to said quadpixel to subpixel processor and to said address generator;

a fourth multiplier connected to said quadpixel to subpixel processor and to said address generator;

a first address complementer connected to said second and fourth multipliers, and to said address generator; and a second address complementer connected to said third and fourth multipliers, and to said address generator.

8. A real-time polar controlled video processor, according to claim 5, wherein said quadpixel to subpixel processor comprises:

a first multiplier connected to said subaddress to quad coefficient transformer, and to said alternating scene database memory;

a second multiplier connected to said subaddress to quad coefficient transformer, and to said alternating scene database memory;

a third multiplier connected to said subaddress to quad coefficient transformer, and to said alternating scene database memory;

a fourth multiplier connected to said subaddress to quad coefficient transformer, and to said alternating scene database memory; and a summer connected to said first, second, third and fourth multipliers, and to said digital-to-analog converter.

* * * * *